(No Model.)
J. C. VALENTINE.
ROAD CART.
No. 479,478. Patented July 26, 1892.
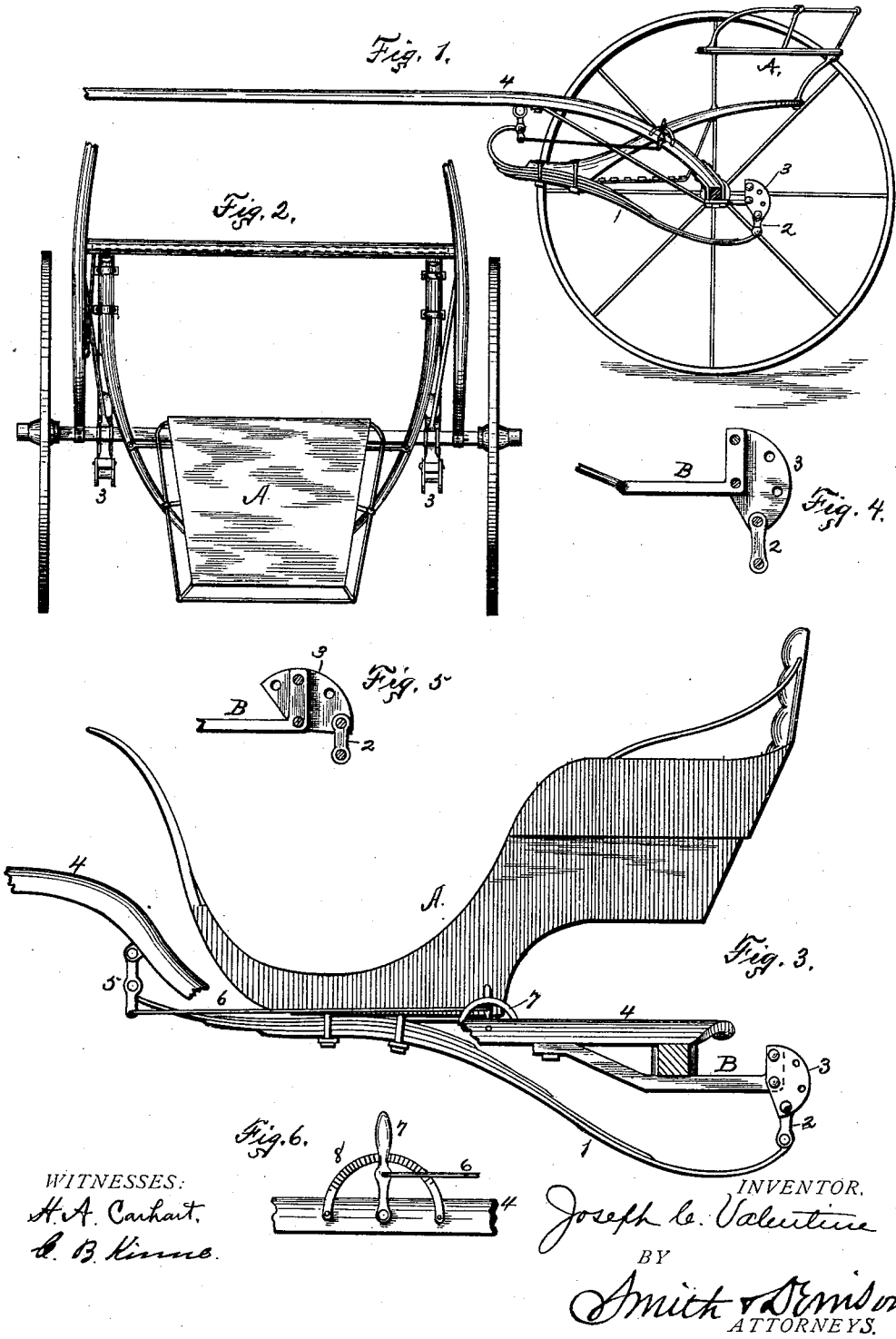
WITNESSES:
H. A. Carhart.
C. B. Kinne.
INVENTOR.
Joseph C. Valentine
BY
Smith & Denison
ATTORNEYS.

UNITED STATES PATENT OFFICE.

JOSEPH C. VALENTINE, OF WATERTOWN, NEW YORK.

ROAD-CART.

SPECIFICATION forming part of Letters Patent No. 479,478, dated July 26, 1892.

Application filed October 22, 1891. Serial No. 409,528. (No model.)

*To all whom it may concern:*

Be it known that I, JOSEPH C. VALENTINE, of Watertown, in the county of Jefferson, in the State of New York, have invented new and useful Improvements in Road-Carts, of which the following, taken in connection with the accompanying drawings, is a full, clear, and exact description.

My invention relates to road-carts, my object being to produce a road-cart which may be readily changed and adapted to a tall or short horse, and so arranged as to readily balance a light or heavy load, and thereby taking all weight from the back of the horse; and to that end my invention consists, first, in providing means for raising and lowering the springs at their rear ends for the purpose of adapting the cart to the use of a tall or short horse, and, second, in the means for throwing the springs forward or backward for the purpose of shifting the center of gravity, and the several other novel features of construction and operation hereinafter described, and which are specifically set forth in the claims hereunto annexed. It is constructed as follows, reference being had to the accompanying drawings, in which—

Figure 1 is a side elevation of my cart complete, showing means for raising and lowering the rear ends of the springs, and, second, for throwing the front end of the springs forward or rearward for the purpose of shifting the center of gravity of the load. Fig. 2 is a top plan view thereof. Fig. 3 is a side elevation showing these features enlarged. Figs. 4 and 5 are views of the vertically-pivoted plate. Fig. 6 is a view of the mechanism used in holding the rod which actuates the forward end of the spring in place.

Similar letters and figures of reference indicate corresponding parts.

A is the seat or body of a road-cart, as shown in Figs. 1 and 3, respectively, supported by the spring 1 in any ordinary way. The rear end of the spring is supported by a shackle 2, loosely secured to the plate 3, which is vertically mounted upon the shank B, to the rear of the axle. The vertical plate 3 is provided with openings about its periphery for the purpose hereinafter explained. The forward ends of the springs 1 1 are secured to the thill 4 by means of shackles, and 5 is an equalizing-bar connecting said shackles centrally across the vehicle.

6 is a rod connecting the lower end of the shackle 5 with the lever 7, mounted upon the rear end of the thill, by which the springs directly and the body indirectly are moved backward and forward simultaneously and held there by the engagement of the lever 7 with the semicircle 8, erected upon the shaft for the purpose of holding the center of gravity at any point desired. It will be observed by this construction that I am enabled at all times to balance the weight upon the body and reduce the weight upon the back of the horse to a minimum, and by this construction I avoid all horse motion. It will also be observed that by mounting the body or seat near the front end of the springs and allowing it to extend backward from the axle I am enabled to get a perpendicular motion to the body or seat, thus avoiding all horse motion, and the equalizing-bar will keep the body horizontal whatever the position of the load may be.

When it is desired to raise the springs, the upper bolt in the vertical plate 3 is removed and said plate is then rotated until the openings in its periphery are rotated and the plate again placed in any of the openings, according to the height to which it is desired to raise the spring, as shown, for instance, in Fig. 5. By this means I am enabled to adapt the cart to a large or small horse at will.

Having described my invention, what I claim is—

1. In a two-wheeled vehicle, thills and springs at their forward ends loosely secured thereto and at their rear ends loosely and adjustably secured to the rearwardly-extending shank.

2. In a two-wheeled vehicle, thills, rearwardly-extending shanks, springs at their forward ends loosely secured to the thills and at their rear ends loosely secured to said shank by means of a vertical plate, and the vertical plate, as set forth.

3. In a two-wheeled vehicle, the thills, rearwardly-extending shanks, springs at their forward ends secured to the thills by means of a double shackle, a rod connected to the lower end of the said shackle, and means for securing its other end rigidly at a point rearwardly, a vertical plate having openings in its periphery secured to the rear end of the shanks, and the shackle connecting the plate to the rear end of the spring, as set forth.

In witness whereof I have hereunto set my hand this 1st day of September, 1891.

JOSEPH C. VALENTINE.

In presence of—
HOWARD P. DENISON,
C. W. SMITH.